United States Patent [19]

Braunecker et al.

[11] Patent Number: 5,289,254
[45] Date of Patent: Feb. 22, 1994

[54] PROCESS AND APPARATUS FOR TESTING OPTICAL COMPONENTS OR SYSTEMS

[75] Inventors: Bernhard Braunecker, Rebstein; Bernhard Gaechter, Balgach, both of Switzerland; André Huiser, deceased, late of Lüchingen, Switzerland, by Christiane Huiser-Simonin, heir

[73] Assignee: Leica Heerbrugg AG, Heerbrugg, Switzerland

[21] Appl. No.: 768,523

[22] PCT Filed: Feb. 5, 1991

[86] PCT No.: PCT/EP91/00219
§ 371 Date: Feb. 6, 1992
§ 102(e) Date: Feb. 6, 1992

[87] PCT Pub. No.: WO91/12510
PCT Pub. Date: Aug. 22, 1991

[30] Foreign Application Priority Data

Feb. 7, 1990 [DE] Fed. Rep. of Germany ....... 4003699

[51] Int. Cl.$^5$ .............................................. G01B 9/00
[52] U.S. Cl. ................................................... 356/124
[58] Field of Search ................. 356/124, 125, 126, 127

[56] References Cited

U.S. PATENT DOCUMENTS

| | | | |
|---|---|---|---|
| 3,832,066 | 8/1974 | Cornsweet | 356/125 |
| 4,007,990 | 2/1977 | McDevitt, Jr. et al. | 356/124 |
| 4,609,818 | 9/1986 | Lennemann et al. | 250/234 |
| 4,815,844 | 3/1989 | Schmalfuss et al. | 356/237 |
| 4,822,165 | 4/1989 | Schmalfuss et al. | 356/239 |

FOREIGN PATENT DOCUMENTS

| | | |
|---|---|---|
| 249799 | 12/1987 | European Pat. Off. . |
| 249800 | 12/1987 | European Pat. Off. . |
| 1490215 | 10/1977 | United Kingdom . |

*Primary Examiner*—F. L. Evans
*Attorney, Agent, or Firm*—Foley & Lardner

[57] ABSTRACT

Process and apparatus for testing optical components (12) or systems which are contained in an apparatus consisting of a focusing optical system (1) and a space-resolving light detector (2) close to the focal plane thereof, it being provided that a source (3), containing a collimator (32), for a narrowly delimited precisely parallel light beam with a plane wavefront is moved rectilinearly in a plane parallel to the wavefront, at a plurality of positions of the source (3) the signal of the light detector (2) is determined, tilting movements of the source (3) perpendicular to the line direction are detected by an apparatus with a second collimator (52) and space-sensitive detector (51), and the aperture of the optical system (1) is scanned twice with line directions rotated relative to one another through approximately 90°, and in addition an individual line coming close to the axis of rotation is scanned in a position rotated through approximately 45°.

6 Claims, 2 Drawing Sheets

PROCESS AND APPARATUS FOR TESTING OPTICAL COMPONENTS OR SYSTEMS

The invention relates to a process and an apparatus for testing optical components or systems which are contained in a focusing optical system and a space-resolving light detector close to the focal plane thereof.

Such processes and apparatuses are known. They represent a modification of Hartmann objective testing, and make use of a parallel light beam which illuminates the entire aperture. From this, one or more narrowly delimited beams are masked out by a perforated diaphragm with one perforation or, in the case of multiplex processes, a plurality of encoded perforations, and thus the entire aperture is scanned.

In this case, the difficulty resides in the presentation of a very precise parallel light beam with a plane wavefront over a large cross section; this demands at least a very high expenditure on optical means.

The object of the invention is to provide a process of the type described and an apparatus which manages without large-scale parallel light beams, and permits a compact, robust and relatively economical construction, even for large apertures.

For a process of the type described, the object is achieved in that a source, containing a collimator, for a narrowly delimited precisely parallel light beam with a plane wavefront is moved rectilinearly in a plane parallel to the wavefront. At a plurality of positions of the source the signal of the light detector is determined. Tilting movements of the source perpendicular to the line direction are detected by an apparatus with a second collimator and a space-sensitive detector, and the aperture of the optical system is scanned twice with line directions rotated relative to one another through approximately 90°. In addition, an individual line coming close to the axis of rotation is scanned in a position rotated through approximately 45°.

Accordingly, the masked-out partial beam of the known method is replaced by a source for only a narrowly delimited parallel light beam with a plane wavefront, which light beam is then moved for scanning over the aperture. In this case, without further measures, the source for the light beam would ideally have to be moved, free from any tilting, over the surface. However, this requirement can be reduced, by the measures, according to the invention, of a partial measurement of the tilting and an averaging of the residual errors by repeated differing scanning movements, to a dimension which can be well controlled by conventional methods.

The invention is explained in greater detail hereinbelow with reference to the drawings. In the drawings.

Figure 1:
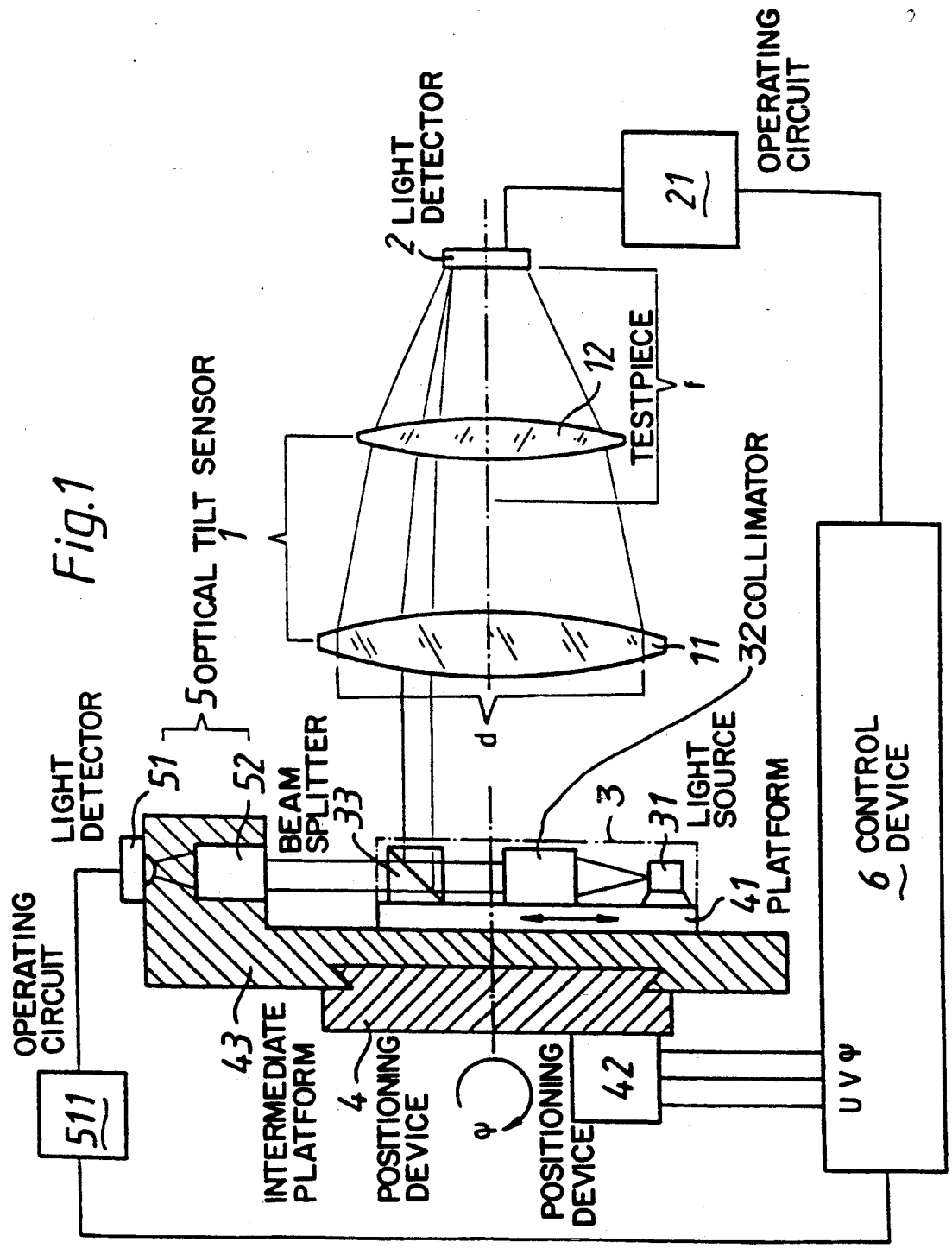
FIG. 1 shows the diagrammatic construction of a testing apparatus.

In FIG. 1, a focusing optical system 1 with the aperture d consists of a lens 11 and a testpiece 12, e.g. a lens or an objective. A space-resolving light detector 2, in particular a highly sensitive lateral detector having a spatial resolution in the nanometer range, is disposed at the spacing of the focal length f, which detector is connected to an operating circuit 21. The active surface area of the light detector 2 is of such magnitude that the entire focus light spot of the optical system 1 affected by defects is covered by it. A light source 31, in particular a laser diode, is combined with a highly corrected collimator 32 and a beam splitter 33 to form a source 3 for a narrowly delimited beam of parallel light with a plane wavefront and disposed on a positioning platform 41. This source 3 directs the parallel light beam, deflected at right angles by the beam splitter 33, having a diameter of, for example, 1 mm, onto the optical system 1, with a wavefront which is planed to an accuracy of one percent of the wavelength.

The positioning platform 41 is movable linearly on a precision positioning device 4 in two orthogonal directions (u,v) and rotatable about an axis ($\phi$) perpendicular thereto. A device 42 effects the positioning movements and position reporting for all three axes (u,v,$\phi$). As regards the axis of rotation, only three defined positions, which are situated at 45° to one another in each instance, are required. Such precision positioning devices are known, for example, as automatic object stages for microscopes and as elements of semiconductor production stations, and have been widely distributed in many variations. The adjustment takes place so that the linear movement axes u,v are aligned parallel to the wavefront of the source 3.

The positioning platform 41 is displaceable in a first axis (u) on an intermediate platform 43, which is in turn displaceable in the second axis (v) orthogonally thereto. On this intermediate platform 43 there is disposed an optical tilt sensor 5, which images that part of the parallel light beam from the collimator 32 which passes rectilinearly through the beam splitter 33 via a second collimator 52, which is advantageously of identical construction, onto a space-resolving light detector 51. The light detector 51 is advantageously of identical construction to the light detector 2. It is likewise connected to an operating circuit 511. In this manner, tilting movements occurring in the course of the scanning movement of the positioning platform in the u direction about the two axes of rotation which are perpendicular to the u direction can be determined to an accuracy amounting to an angular error of 10 n rad.

As a result of the rotational symmetry of the wavefront, rotations about the optical axis of the collimator 32 are without significance. A lateral parallel displacement is without significance, since the collimator 32 emits a plane wave.

Thus, in each instance as a result of displacement of the positioning platform 41, a line of the aperture of the optical system 1 is scanned, and for a number of positions the measured value of the space-resolving light detector 2 and of the tilt sensor 5 and the position reporting of the precision positioning device 4 are passed to a control device 6 and stored there.

After the scanning of a line in the u direction of the aperture of the optical system 1, the control device 6 effects, via the device 42, a movement step of the intermediate platform 43 in the v direction and then a further line scanning in the u direction.

In the course of each movement step in the v direction, the intermediate platform 43 is displaced, including the tilt sensor 5; in this case, the latter can be both tilted and also laterally decentered.

It would now again be possible to supervise this movement, but it would be necessary to monitor all three angles and two translations; at the required levels of accuracy, this would be very costly.

Figure 2A:
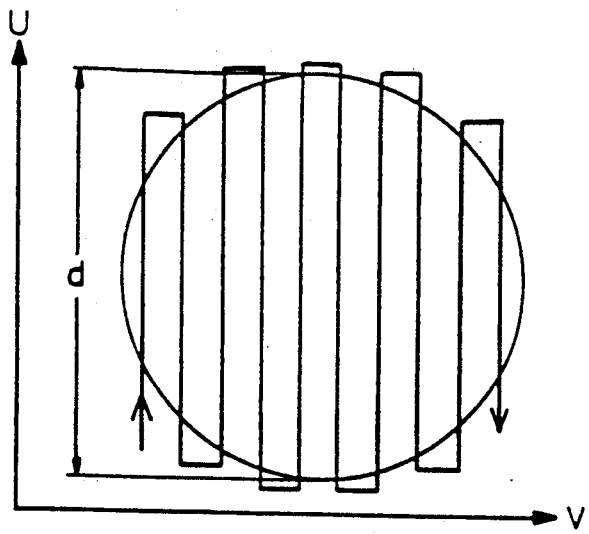
FIG. 2 shows, in the partial FIGS. 2a), 2b) and 2c), the individual scanning procedures.

This expenditure is avoided by the procedure diagrammatically represented in FIGS. 2 a) to c).

Under the control of the control device 6, in the first instance, the entire aperture of the optical system 1 is scanned by lines in the u direction, and at each measurement point all data are stored.

In this case, only the spatial information in the x coordinate, corresponding to the line direction u, of the space-resolving light detector 2 is utilized.

Figure 2B:
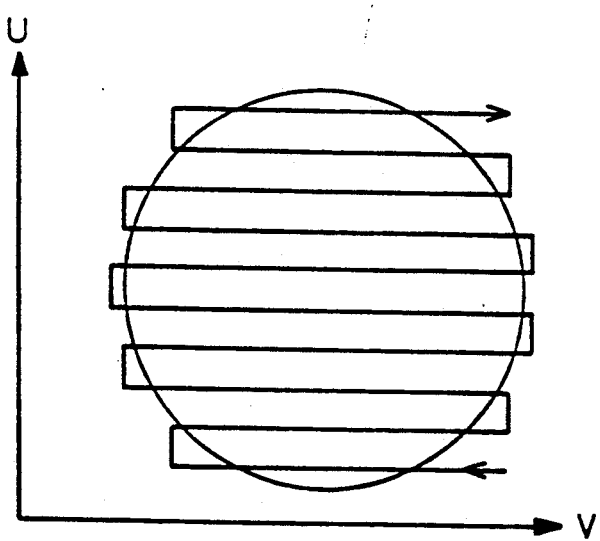

The intermediate platform 43 and the positioning platform 41 are then rotated through the angle $\phi=90°$, using the precision positioning device 4. The entire aperture of the optical system 1 is now again scanned linewise; in this case, the line direction for which the tilt sensor 5 is effective is now situated in the v direction, as shown in FIG. 2b).

In the course of this second scanning, the y coordinate—now corresponding to the line direction v—of the space-resolving light detector 2 is utilized and stored pointwise together with the position data of the positioning device 4 and the data of the tilt sensor 5.

Figure 2C:
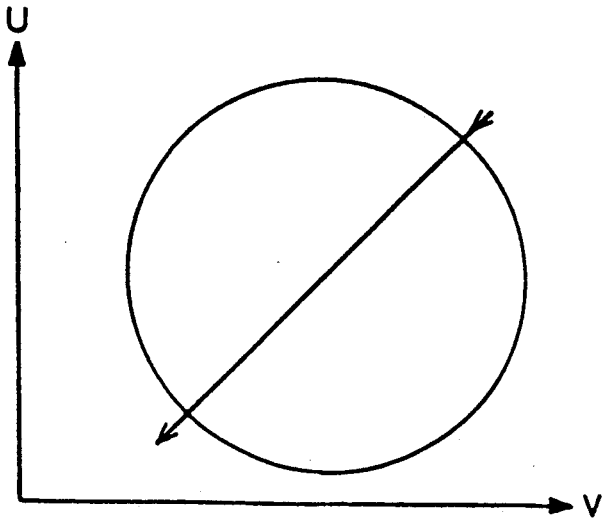

In addition, a third scanning in a position of the positioning platform 41 which is rotated through $\phi=45°$ relative to the first two positions is also performed by the control device 6, but only in one line situated close to the axis of rotation of the positioning device 4, as shown in FIG. 2c).

In this manner, it is possible to eliminate by computation spatial errors which arise in the course of the movements of the positioning device 4.

The control device 6 is advantageously constructed using microprocessor technology, and also utilized for the evaluation of data.

The apparatus described with reference to the example and the process can be employed to test different optical systems, not only the lens 12 shown but also objectives or mirrors etc. When testing mirrors, it is then possible to bend the optical axis. It is also possible to investigate the oblique passage of the parallel beam through the optical system by tilting in relation to the positioning device. Besides the conventional lens defects, it is possible in particular to use the apparatus to investigate the deformation of wavefronts.

Furthermore, it is possible to undertake measurements on the complete combination consisting of the focusing optical system 1 and detector 2, in particular, for calibration purposes.

In one example, the combination, in front of which a Hadamard-encoded diaphragm is to be positioned, is part of a multiplex Hartmann wave front sensor. Such a wave front sensor forms the subject of the patent application "Wave front sensor" (our reference: A 2331) of the same applicant and having the same filing date corresponding to U.S. patent application Ser. No. 07/768,845, filed Oct. 7, 1991.

This system can be calibrated to an accuracy of measurement of approximately one percent of the wavelength of the light, using the described scanning with a collimated light beam having a diameter of 0.8 mm.

Of course, it is equally possible to pivot the light source 31 and collimator 32 of the source 3 through 90° in relation to the apparatus shown in FIG. 1 and to direct the partial beam which passes straight through the beam splitter 33 onto the focusing optical system.

The spectral variation of the properties of the tested components or systems can be determined if the light source 31 is tuned.

We claim:

1. A process for testing optical components (12) or systems (1) which are contained in an apparatus consisting of a focusing optical system (1) and a space-resolving light detector (2) close to the focal plane of the focusing optical system, wherein a source (3), containing a collimator (32) for providing a narrowly delimited and precisely parallel light beam with a plane wavefront is moved rectilinearly in a plane parallel to the wavefront, the signal of the light detector (2) being determined at a plurality of positions of the light source, tilting movements of the source (3) perpendicular to the line direction of said light beam being detected by an apparatus with a second collimator (52) and a space-sensitive detector (51), and the aperture of the optical system (1) being scanned twice along line directions rotated relative to one another through approximately 90°, an individual line coming close to the axis of rotation being scanned in a position rotated through approximately 45°.

2. An apparatus for testing optical components (12) or systems (1) which are contained in an apparatus consisting of a focusing optical system (1) and a space-resolving light detector (2) close to the focal plane thereof, wherein a source (3), containing a collimator (32), for a narrowly delimited beam of parallel light with a plane wavefront is disposed on a precision positioning device (4) with two approximately mutually orthogonal axes of linear movement (u,v), which are disposed parallel to the plane of the wavefront, and an axis of rotation ($\phi$) which is approximately orthogonal thereto and a tilt sensor apparatus (5) is provided, having a second collimator (52) and a space-sensitive detector (51), both of which are disposed at one end of a guideway for the first axis of said two axes of linear movement, and wherein a control device (6) is connected therewith, which acts so that the aperture of the focusing optical system (1) is scanned linewise, the first axis of linear movement representing the line direction and the scanning taking place twice with a position rotated through approximately 90° with respect to the axis of rotation, and in addition an individual line coming close to the axis of rotation being scanned in a position rotated through approximately 45°.

3. The apparatus as claimed in claim 2, wherein the combination of the focusing optical system (1) and detector (2) is the system to be tested.

4. The apparatus as claimed in claim 2, wherein the optical system to be tested consists of converging optics and light detector of a wave front sensor.

5. The apparatus as claimed in claim 2, wherein the source (3) consists of a light source (31), a collimator (32) and a beam splitter (33), the beam splitter (33) forming a first partial beam which is deflected at right angles and forms the plane wavefront of the source (3), which is directed onto the focusing optical system (1), and forms a second partial beam which is directed straight onto the second collimator (52).

6. The apparatus as claimed in claim 3, wherein the optical system to be tested consists of converging optics and light detector of a wave front sensor.

* * * * *